US010974307B2

(12) United States Patent
Konopacki et al.

(10) Patent No.: US 10,974,307 B2
(45) Date of Patent: Apr. 13, 2021

(54) SYSTEM, METHOD AND APPARATUS FOR MANIPULATING A WORKPIECE

(71) Applicant: GENERAL ELECTRIC TECHNOLOGY GMBH, Baden (CH)

(72) Inventors: Ronald Francis Konopacki, Suffield, CT (US); Allan Ferry, Windsor, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 279 days.

(21) Appl. No.: 15/843,840

(22) Filed: Dec. 15, 2017

(65) Prior Publication Data

US 2019/0184445 A1 Jun. 20, 2019

(51) Int. Cl.
| | |
|---|---|
| *B23K 31/10* | (2006.01) |
| *B23K 37/053* | (2006.01) |
| *B21D 53/06* | (2006.01) |
| *B23Q 17/22* | (2006.01) |
| *G05B 19/402* | (2006.01) |
| *B23B 5/16* | (2006.01) |
| *B23Q 3/18* | (2006.01) |
| *B23K 9/028* | (2006.01) |
| *B23K 9/095* | (2006.01) |
| *B23K 9/235* | (2006.01) |
| *B23K 31/02* | (2006.01) |

(52) U.S. Cl.
CPC .............. *B21D 53/06* (2013.01); *B23B 5/162* (2013.01); *B23B 5/168* (2013.01); *B23K 9/028* (2013.01); *B23K 9/0956* (2013.01); *B23K 9/235* (2013.01); *B23K 31/027* (2013.01); *B23K 31/10* (2013.01); *B23K 37/053* (2013.01); *B23Q 3/183* (2013.01); *B23Q 17/2275* (2013.01); *G05B 19/402* (2013.01); *B23B 2260/128* (2013.01); *G05B 2219/37199* (2013.01); *G05B 2219/45135* (2013.01); *G05B 2219/49112* (2013.01); *G05B 2219/49113* (2013.01)

(58) Field of Classification Search
CPC ........... B23C 1/06; B23C 3/002; B23K 31/10; B23K 37/053–0535
See application file for complete search history.

(56) References Cited

U.S. PATENT DOCUMENTS

| | | | |
|---|---|---|---|
| 4,099,418 A | 7/1978 | Bennett et al. | |
| 7,654,379 B2 * | 2/2010 | Boberg | B23C 3/002 |
| | | | 198/339.1 |
| 2016/0184905 A1 * | 6/2016 | Tanaka | B23C 3/12 |
| | | | 409/138 |

* cited by examiner

*Primary Examiner* — Christopher J Besler
(74) *Attorney, Agent, or Firm* — Grogan, Tuccillo & Vanderleeden, LLP

(57) ABSTRACT

An automated system for manipulating a workpiece includes a machining device, a locating device configured to determine a position of a workpiece, and a positioning system operatively connected to the machining device and being configured to adjust a position of the machining device to align a centerline of the machining device with a longitudinal axis of the workpiece, based upon the determined position of the workpiece. The machining device includes a stabilizing mechanism to engage the workpiece to maintain the workpiece in the determined position, and a cutting element for performing a machining operation on the workpiece.

13 Claims, 6 Drawing Sheets

SYSTEM, METHOD AND APPARATUS FOR MANIPULATING A WORKPIECE

BACKGROUND

Technical Field

Embodiments of the invention relate generally to the manufacture of boiler components and, more particularly, to a system, method and apparatus for machining weld preparations on the ends of tubular workpieces, such as on the ends of header nipples for a boiler

Discussion of Art

Steam headers used in industrial facilities and systems typically consist of long pipe runs connecting boilers, turbines, heat recovery steam generators (HRSGs), and process equipment. For example, in a steam generation plant, a header, also referred to as a collector, is an important pressure part used to collect water or steam from an array of tubes in various circuits of the steam generator, such as from an economizer, a superheater, reheater elements, or water-wall panels. Such headers are typically made from a length of pipe which have numerous short tubes, known as nipples, welded thereto, which are bent to a geometry enabling in-field connection to, for example, furnace wall circuits.

Existing header fabrication techniques typically begin with lengths of pipe that are welded end-to-end to achieve a desired header length. An array of holes are then drilled in the header where the nipples will be attached, and the nipples are fitted and manually welded in place. Once the nipples are welded to the header, the ends of each nipple are machined with a weld preparation for use in field construction where they are joined with other tube ends of element assemblies or waterwall panels.

Currently, weld preparations are machined on the end of each nipple using manual hand scarfing tools or radial drilling machines. This process is typically carried out in two discrete steps, first manually cutting the nipples to proper length using a band saw, and then manually forming the weld preparation using a portable, hand-operable scarfing device. As a typical header may include hundreds of nipples, this manual header fabrication process can be very labor intensive, time consuming and costly. In addition, in assemblies where the header nipples are tightly arranged with little clearance between adjacent nipples, it may be difficult to properly position the saw to even cut the tubes to proper length before machining the weld preparations on the ends of the nipples. Automated weld preparation, however, has heretofore not been possible due to the difficulty in locating the center and distal ends of each nipple, which are often out of precise alignment with one another due to weld shrinkage (which occurs during the prior step of attaching the nipples to the header) and inaccuracies in the bends of the nipples. Accordingly, manual fabrication processes have prevailed out of necessity.

In view of the above, there is therefore a need for an automated system and method for machining the weld preparations on the ends of the nipples of a header.

BRIEF DESCRIPTION

In an embodiment, an automated system for manipulating a workpiece is provided. The system includes a machining device, a locating device configured to determine a position of a workpiece, and a positioning system operatively connected to the machining device and being configured to adjust a position of the machining device to align a centerline of the machining device with a longitudinal axis of the workpiece, based upon the determined position of the workpiece. The machining device includes a stabilizing mechanism to engage the workpiece to maintain the workpiece in the determined position, and a cutting element for performing a machining operation on the workpiece.

In another embodiment of the invention, a method for manipulating a workpiece is provided. The method includes the steps of determining a position of a header nipple, including determining a center of the header nipple, aligning a machining device with the workpiece in dependence upon the determined position of the workpiece, deploying the machining device to engage an interior wall of the header nipple to main the header nipple in the determined position, and machining a weld preparation on an end of the header nipple with the machining device.

In yet another embodiment, an apparatus for manipulating a workpiece is provided. The apparatus includes a stabilizing device configured to physically engage a sidewall of a tubular workpiece and a cutting element having at least one cutting insert radially offset from a centerline of the cutting element, the cutting element being configured to rotate about the centerline. The cutting element is configured to cut the tubular workpiece to a predetermined length and machine a weld preparation on the end of the tubular workpiece in a single step.

DRAWINGS

The present invention will be better understood from reading the following description of non-limiting embodiments, with reference to the attached drawings, wherein below:

DETAILED DESCRIPTION

Figure 1:
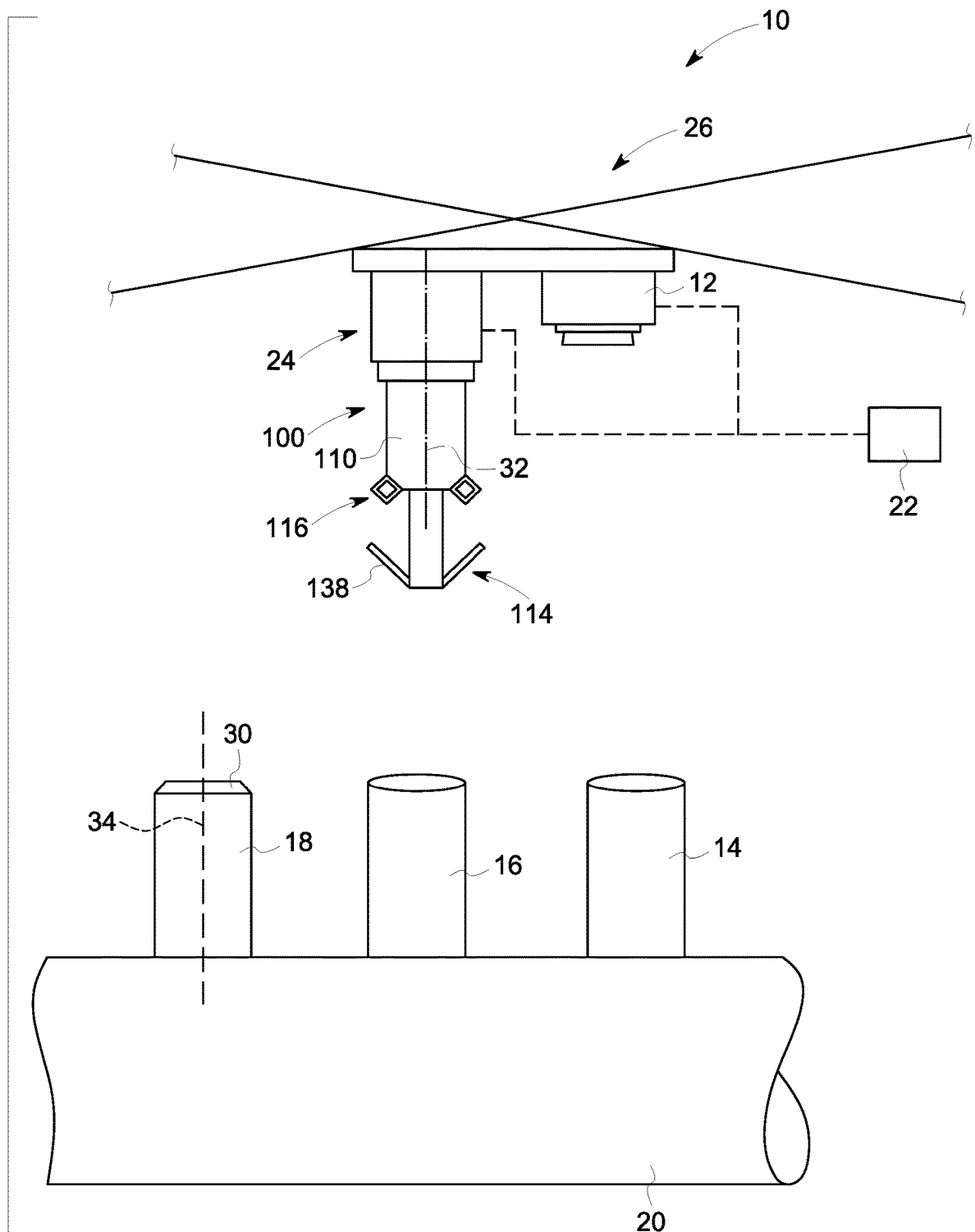
FIG. 1 is a schematic illustration of an automated system for manipulating a workpiece, according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for machining weld preparations on the ends of header nipples for use in boilers, embodiments of the invention may also be applicable for machining weld preparations on almost any tube or pipe end in a boiler such as, for example, large pipes, headers, boiler water-wall tubes and the like. Moreover, while embodiments of the invention are used for machining weld preparations on the ends of tubes and pipes, it is also contemplated that the invention may likewise be utilized to perform various other mechanical operations such as, for example, machining, sanding, grinding, cutting and the like, on tubular and other components in an automated manner.

As used herein, "operatively coupled" refers to a connection, which may be direct or indirect. The connection is not necessarily a mechanical attachment. As used herein, "fluidly coupled" or "fluid communication" refers to an arrangement of two or more features such that the features are connected in such a way as to permit the flow of fluid between the features and permits fluid transfer. As used herein, "weld preparation" refers to the specific geometry of one or more of the edges that will make up a welded joint (e.g., a butt, corner, edge, lap, or tee joint), and may include for example, a bevel a groove or other structure to accommodate the weld material.

Embodiments of the invention relate to a system, method and apparatus for manipulating a workpiece, such as nipples of a header of a boiler. The system includes a locating device configured to determine a position of a workpiece in space, a machining device, and a positioning system operatively connected to the machining device and being configured to adjust a position of the machining device to align the machining device with the workpiece, in dependence upon the determined position of the workpiece. The machining device includes a stabilizing mechanism configured to engage the workpiece to substantially maintain the workpiece in static position, and a cutting element for performing a machining operation on the workpiece. The locating device is configured to automatically determine the position of the workpiece in space utilizing at least one of a physical probe, optical image capture, hall effect sensors, sonar, or laser position measurement. The machining device is configured to cut the header nipple to length and machine a weld preparation on the end of the nipple in a single step without manual intervention by an operator.

Referring to FIG. 1, a system 10 for manipulating a workpiece according to an embodiment of the invention is illustrated. The system 10 includes a center locating device 12 configured to automatically detect or otherwise locate a center of a workpiece to be manipulated such as, for example, tubular nipples 14, 16, 18 of a header 20. The center locating device 12 device may be any type of device known in the art for locating the position or center of a component (namely, a tubular or cylindrical component) in space. For example, in an embodiment, the center locating device 12 may utilize a mechanical probe to measure/detect the physical location of the nipple (e.g., nipple 18) in space by contacting the nipple 18 (referred to herein as "mechanical detection"). In an embodiment, the center locating device 12 may optically determine the location of the center of the nipple 18 using one or more image capture devices and sensors, as taught by U.S. patent application Ser. No. 15/286,910, which is hereby incorporated by reference herein in its entirety (referred to herein as "optical detection"). It is further contemplated that the system 10 may utilize other position detection technologies such as, for example those employing hall effect sensors, sonar, or laser position measurement.

As further illustrated in FIG. 1, the center locating device 12 may be integrated with a CNC or other automated control and positioning system 26 for controlling the position of the center locating device 12 during the center detection process. The CNC interface is used for X-Y-Z positioning, for centering, and for tool deployment, as discussed in detail hereinafter. Regardless of the specific configuration of the center locating device 12, the data acquired by the center locating device 12 regarding the position of the nipple 18 in space can be automatically input into a control unit 22 as an offset from an expected location of the center of the nipple 18 (such as that determined from technical drawings stored in memory), so that a position of a machining device can be aligned with the nipple 18, as discussed in detail hereinafter.

With further reference to FIG. 1, the system may further include a machine tool 24 operatively connected to the control and positioning system 26, although in certain embodiments, the control and positioning system for the machine tool 24 may be a separate positioning system for the control and positioning system used for the center locating device 12. The machine tool 24 is configured to removably receive a machining device 100. In an embodiment, the machining device 100 may be an apparatus configured to machine a weld preparation 30 on a distal end of the nipples 14, 16, 18.

Referring now to FIGS. 1-4, the machining device 100 according to an embodiment of the invention is illustrated. The machining device 100, as alluded to above, is an apparatus configured to machine a weld preparation on a distal end of the nipples. In an embodiment, the machining device 100 includes a tool body 110 having a collet, taper 112 or other attachment means configured to interface with the machine tool 24 in a releasable manner (such through corresponding taper on the machine tool 24). A detailed illustration of the tool body 110 is shown in FIG. 5. In an embodiment, the tool body 110 is configured to fit into a standard CNC tool holder (e.g., CAT 50, NB or other tool holder) capable of automatic tool changeout. As discussed in detail hereinafter, the machining device 100 includes a gripping or stabilizing mechanism 114 for gripping and/or stabilizing the nipples during a cutting operation, and a cutting element 116 for cutting the nipples to proper length and machining a weld preparation on the distal ends of the nipples.

Figure 2:
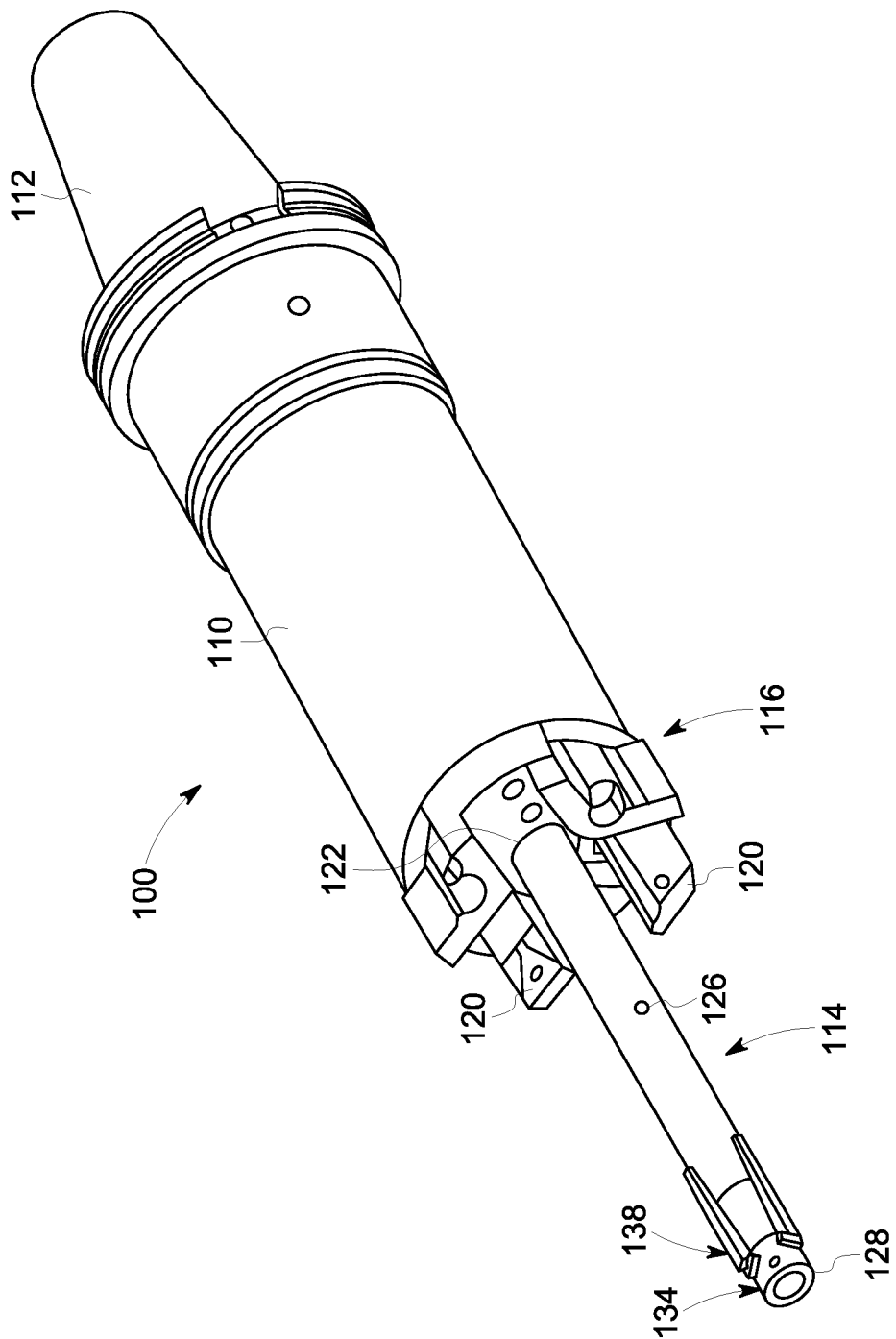
FIG. 2 is a perspective illustration of the machining device of the system of FIG. 1, for machining weld preparations on the ends of tubes, according to an embodiment of the invention.
Figure 3:
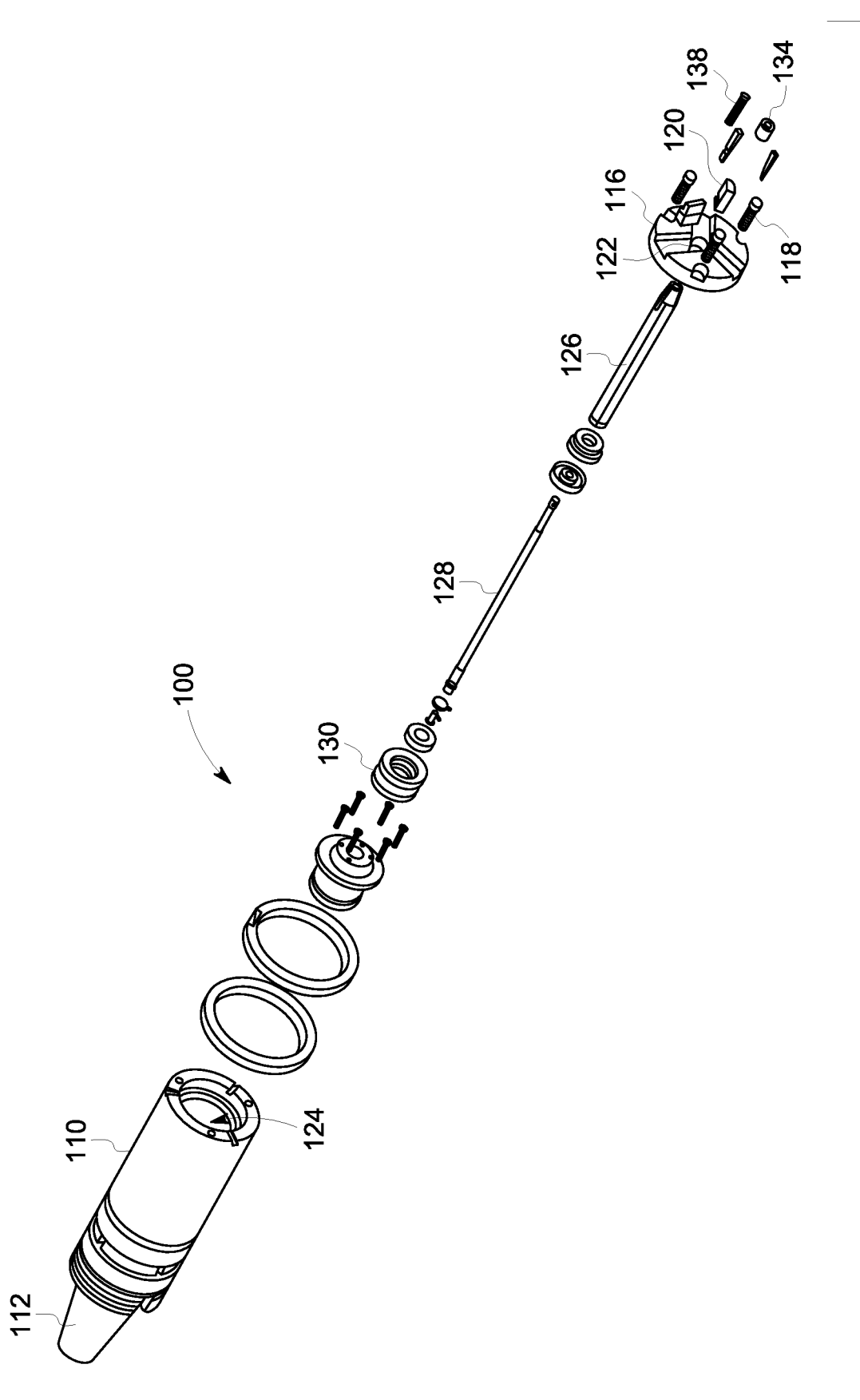
FIG. 3 is an exploded, perspective illustration of the machining device of FIG. 2.
Figure 4:
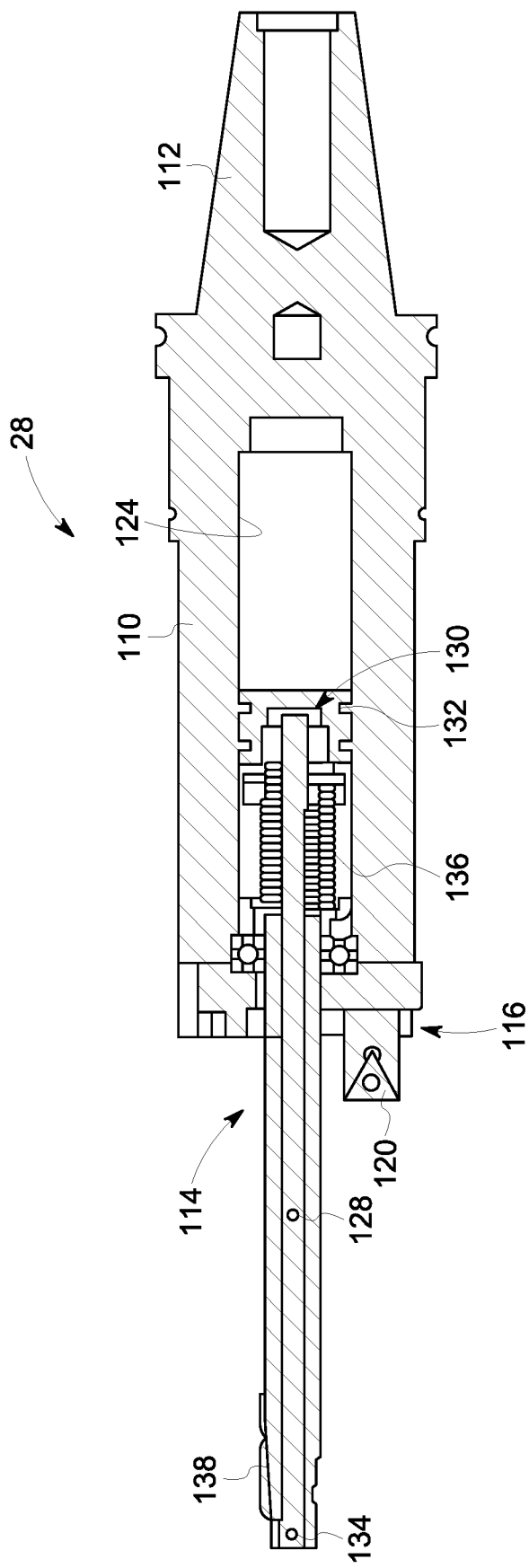
FIG. 4 is a longitudinal cross-sectional illustration of the machining device of FIG. 2.
Figure 5:
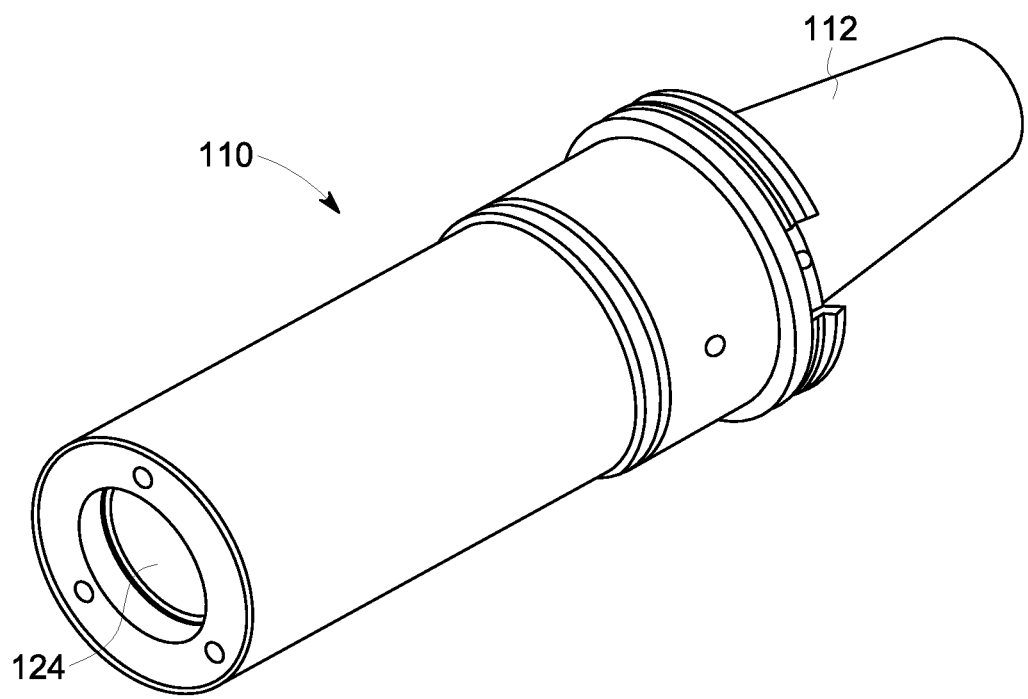
FIG. 5 is a perspective illustration of a body portion of the machining device of FIG. 2.

With specific reference to FIGS. 2-4, the specific configuration of the stabilizing mechanism 114 and cutting element 116 according to an embodiment of the invention is illustrated. As illustrated therein, the cutting element 116 generally includes a disc-shaped body rigidly affixed to the distal end of the tool body 110 via a plurality set screws 118 in a manner such that the cutting element rotates 116 about a central, rotational axis 32 with the machining device 100. A plurality of cutting inserts or cutting teeth 120 are affixed to the bottom surface of the body and depend downwardly therefrom. The cutting teeth 120 are spaced the rotational axis 32 of the machining device 100 a distance that is approximately equivalent to a radius of nipples to be machined, and are angled or beveled so as to produce a beveled weld preparation on the distal ends of the nipples. In an embodiment, the cutting teeth 120 may be configured so as to form a weld preparation having more than one angle. As shown therein, the body of the cutting element 116 also includes a central aperture or throughbore 122 to accommodate the stabilizing mechanism 114.

Figure 6:
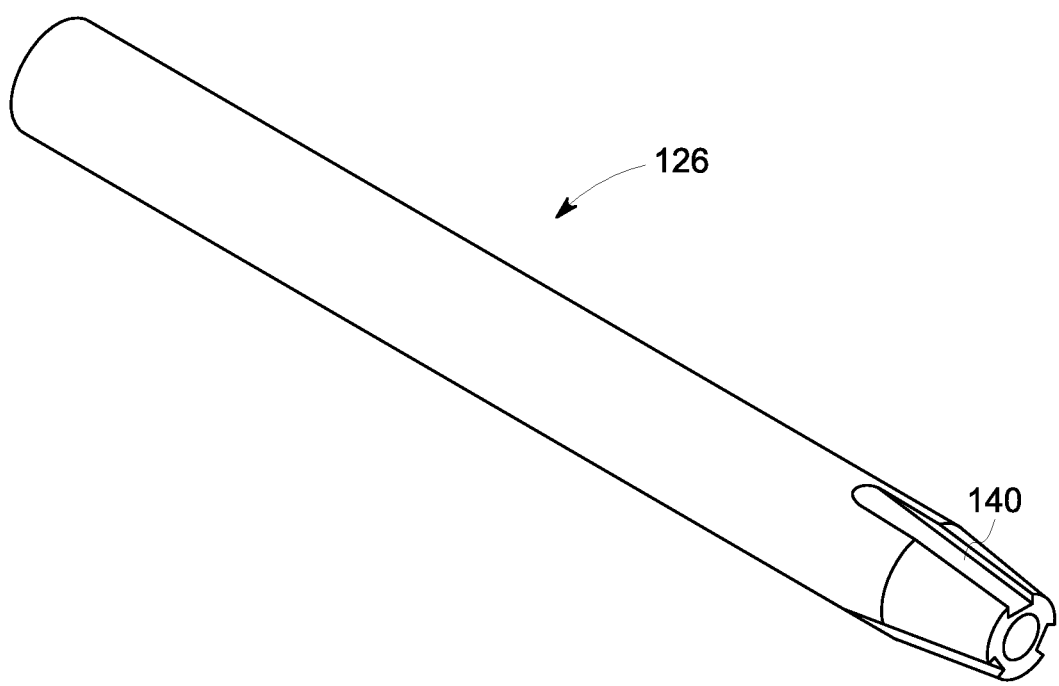
FIG. 6 is a perspective illustration of a spline shaft or mandrel of the machining device of FIG. 2.
Figure 7:
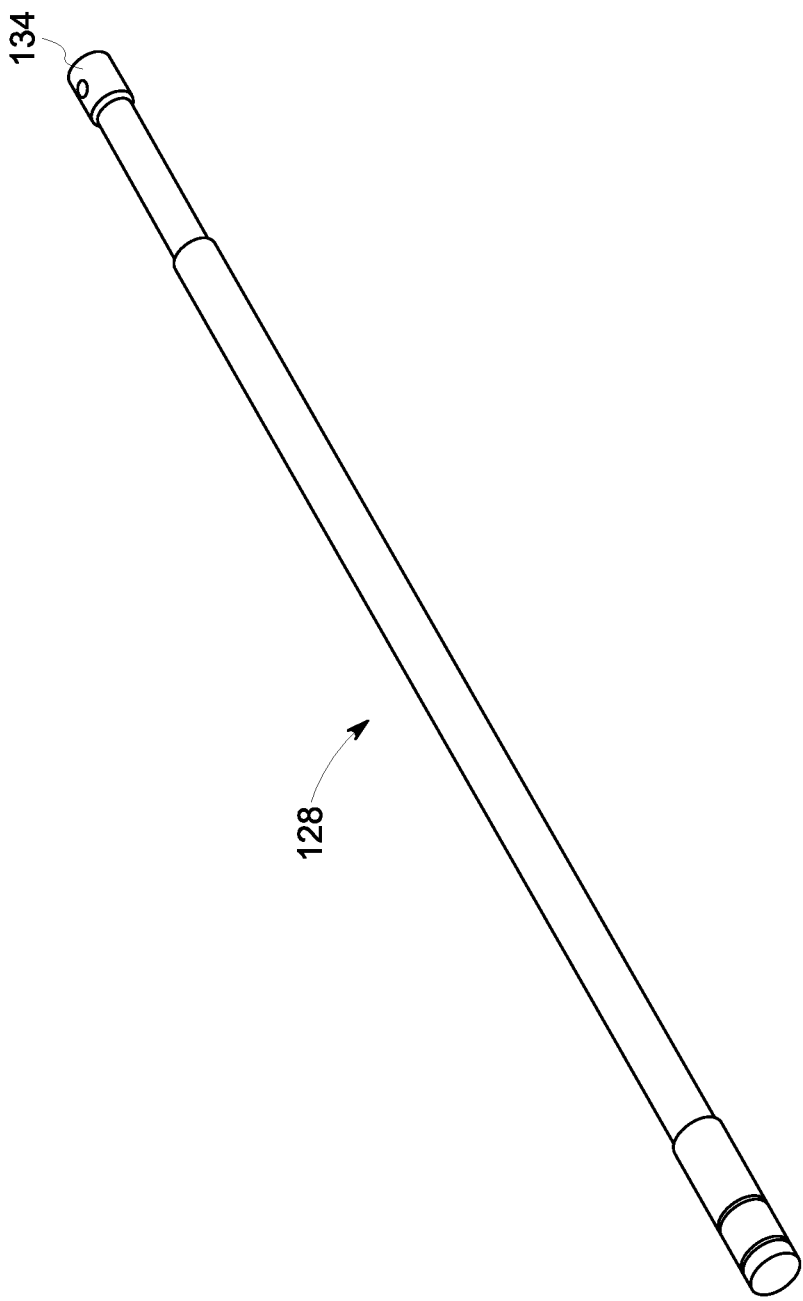
FIG. 7 is a perspective illustration of a draw rod of the machining device of FIG. 2.

With further reference to FIGS. 2-4, the tool body 110 includes a hollow passageway or bore 124 configured to slidably receive the stabilizing mechanism 114. In an embodiment, the stabilizing mechanism 114 includes a spline shaft 126 that extends through the throughbore 122 of the cutting element 116 and into the bore 124 of the tool body. A detailed illustration of the spline shaft 116 is shown in FIG. 6. The spline shaft 116 is generally hollow and receives therethrough a draw rod 128 that likewise extends into the bore 124 and which is operatively connected to a piston 130 slidably received within the bore 124. A detailed illustration of the draw rod 128 is shown in FIG. 7. A distal end of the draw rod 128 may include an actuator 134 coupled thereto. A seal 132 is disposed between the piston 130 and the inner walls of the bore 124. A coil spring 136 is disposed forward of the piston 130. In an embodiment, the draw rod 128 is extendable from the spline shaft 126 against the bias of the coil spring 136 to selectively extend wings or gripping members 138 from slots 140 in the spline shaft 126. The gripping members are configured to engage the interior walls of the nipples to hold and stabilize the nipples against lateral movement during the cutting process, as described hereinafter.

In operation, once the nipples are welded to a header (which in many cases can be hundreds of nipples), the control unit 22 is configured to determine the center of the one of the nipples, e.g., nipple 18, using the center locating device 12, in the manner described above. Once the center of the nipple 18 is determined, the positioning system 26, under control of the control unit 22, positions the machine tool 24 and machining device 100 such that a centerline 32 of the machining device 100 is aligned with a centerline (e.g., centerline 34) of the nipple 18 so that a machining operation can be carried out on the nipple 18. In particular, once the true center of the nipple 18 is determined or calculated (which in some embodiments may be a calculated offset from an expected position), the control unit 22, using the positioning system 26, moves the machining device 100 to the coordinate position corresponding to the center of the nipple 18 in rapid traverse. The machine tool 24 and machining device 100 is then activated to a predetermined rotational speed, and a flow of coolant to the cutting element 116 may be initiated.

The control unit 22 then moves the machining device 100 in a descending motion, along a Z-axis into the nipple 18. In particular, the machining device 100 is lowered towards the open end of the nipple 18 so that the spline shaft 126 and draw rod 128 enter the nipple 18. A spring force, pneumatic actuator, or hydraulic actuator can then be used to extend the gripping members 138 until they engage the interior walls of the nipple 18 to hold it in position and minimize chatter. In an embodiment, the gripping member 138 may automatically extend to a gripping position when the machining tools starts to rotate. In other embodiments, it is contemplated that the machining device 100 includes an external sleeve or collar that receives the nipple 18 and is configured to engage the outer peripheral surface of the nipple to hold it steady during a cutting operation. In addition to holding the nipple steady, the stabilizing mechanism 114 may also function to center the nipple 18 with a rotational axis of the machining device 100, to the extent that the nipple still may be slightly misaligned. In an embodiment, either the internal or external guide/stabilizing mechanism may contain rollers or bearings to minimize friction as the cutting element rotates in relation to the nipple. These rollers or bearings that may roll against the inside or outside of the nipple, respectively, or may permit the stabilizing mechanism 114 to rotate in relation to the cutting surfaces with minimal friction.

As the stabilizing mechanism 114 holds the tube in place, the cutting element 116 rotates to remove material from the face of the nipple 18 with the beveled cutting teeth/inserts 120. As the machine tool 24 and attached machining device 100 are moved downward, the cutting element continues to remove material from the nipple to effectively cut the nipple 18 to proper length and to machine a beveled weld preparation 30 on the end of the nipple. In this respect, a single operation, using a single tool both 'cuts' the nipple to length and machines the weld preparation on the end of the nipple. This is in contrast to existing manual processes, where discrete steps and multiple devices must be used to first cut the nipples to length and then form the weld preparations on the distal ends of the nipples.

Once the weld preparation is formed on the nipple 18, the machining device 100 retracts from the nipple 18 and the above-described process is automatically repeated on an adjacent nipple. Accordingly, the invention therefore allows for the automated machining of weld preparations on the distal ends of header nipples in a continuous process, without requiring any manual intervention by a human operator. Compared to the use of a manual scarfing machine, the system of the invention permits even nipple heights to be quickly created as the cutting element 116 descends to the required height or depth while machining each nipple, permitting the nipples to be cut to the design lengths. This eliminates the need to manually cut each header nipple to approximate length by quickly machining away extra material. In an embodiment, the positioning system 26 can be used to measure/detect the height of each nipple before machining so that the cutting element 116 can be quickly moved to a location just above the end of the nipple and then moved into the nipple at an appropriate speed for material removal. A significant increase in production speed and a reduction in the manual labor required thus reduce the cost of manufacture, as a whole.

In an embodiment, the cutting teeth or inserts 120 may be removable from the cutting element 116 to provide for easy changeout. For example, the cutting teeth may be removable from the cutting element so that cutting teeth having a different configuration (e.g., a different bevel) may be installed to allow for the machining of a weld preparation having any desired geometry (e.g., "V" or "J" preparation shapes). In an embodiment, the cutting teeth/inserts 120 may be selectively positionable at various radial locations on the cutting element 116 to correspond to any nipple diameter. As alluded to above, the machining device 100 may include coolant passages configured to direct coolant onto the end of the nipple being machined to prevent overheating of the metal or cutting tools and to aid in removing metal chips from the machining area. This helps to increase the speed of machining and manufacture of the header as a whole.

In an embodiment, an automated system for manipulating a workpiece is provided. The system includes a machining device, a locating device configured to determine a position of a workpiece, and a positioning system operatively connected to the machining device and being configured to adjust a position of the machining device to align a centerline of the machining device with a longitudinal axis of the workpiece, based upon the determined position of the workpiece. The machining device includes a stabilizing mechanism to engage the workpiece to maintain the workpiece in the determined position, and a cutting element for performing a machining operation on the workpiece. In an embodiment, the locating device is configured to automatically determine the position of the workpiece utilizing at least one of a physical probe, optical image capture, hall effect sensors, sonar, or laser position measurement. In an embodiment, the workpiece is a tubular workpiece having an interior tube wall and an exterior tube wall, and the machining operation is machining a weld preparation on an end of the tubular workpiece. In an embodiment, the cutting element includes a plurality of interchangeable cutting inserts. In an embodiment, the stabilizing mechanism includes at least one gripping arm to contact the interior tube wall of the tubular workpiece to hold the tubular workpiece in the determined position. In an embodiment, the stabilizing mechanism is configured to contact an outer wall of the tubular workpiece to hold the tubular workpiece in the determined position. In an embodiment, the cutting element is configured to cut the tubular workpiece to a predetermined length and machine the weld preparation on the end of the tubular workpiece in a single step. In an embodiment, the locating device is configured to determine a center of the tubular workpiece. In an embodiment, the system further includes a control unit communicatively coupled to the locating device, the machining device and the positioning system, the control unit being configured to automatically determine the position of the tubular workpiece, align the machining device with the tubular workpiece, cut the tubular workpiece to length and machine the weld preparation on the tubular workpiece without manual intervention. In an embodiment, he cutting element includes at least one cutting insert radially offset from a centerline of the cutting element, the cutting element being configured to rotate about the centerline. In an embodiment, a radial position of the at least one cutting insert is adjustable with respect to the centerline of the machining device. In an embodiment, the stabilizing mechanism is configured to extend past the cutting element and engage the interior tube wall of the tubular workpiece.

In another embodiment of the invention, a method for manipulating a workpiece is provided. The method includes the steps of determining a position of a header nipple, including determining a center of the header nipple, aligning a machining device with the workpiece in dependence upon the determined position of the workpiece, deploying the machining device to engage an interior wall of the header nipple to main the header nipple in the determined position, and machining a weld preparation on an end of the header nipple with the machining device. In an embodiment, the method may also include the step of machining the header nipple to a predetermined length, wherein machining the header nipple to the predetermined length and machining the weld preparation are carried out in a single step. In an embodiment, the step of determining the position of the workpiece is carried out using one of a mechanical probe, optical image capture, hall effect sensors, sonar, or laser position measurement. In an embodiment, the machining device is configured to engage an outer wall of the nipple to maintain the workpiece in the determined position.

In yet another embodiment, an apparatus for manipulating a workpiece is provided. The apparatus includes a stabilizing device configured to physically engage a sidewall of a tubular workpiece and a cutting element having at least one cutting insert radially offset from a centerline of the cutting element, the cutting element being configured to rotate about the centerline. The cutting element is configured to cut the tubular workpiece to a predetermined length and machine a weld preparation on the end of the tubular workpiece in a single step. In an embodiment, the tubular workpiece is a header nipple. In an embodiment, the stabilizing device is configured to extend past the cutting element and engage interior walls of the tubular workpiece. In an embodiment, the apparatus also includes a control and positioning device configured to position the stabilizing device and cutting element in alignment with a center of the tubular workpiece.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An automated system for manipulating a workpiece, comprising:
   a machining device;
   a locating device configured to determine a position of a workpiece; and
   a positioning system operatively connected to the machining device and being configured to adjust a position of the machining device to align a centerline of the machining device with a longitudinal axis of the workpiece, based upon the determined position of the workpiece;
   wherein the machining device includes a stabilizing mechanism to engage the workpiece to maintain the workpiece in the determined position, and a cutting element for performing a machining operation on the workpiece.

2. The system of claim 1, wherein:
   the locating device is configured to automatically determine the position of the workpiece utilizing at least one of a physical probe, optical image capture, hall effect sensors, sonar, or laser position measurement.

3. The system of claim 1, wherein:
   the workpiece is a tubular workpiece having an interior tube wall and an exterior tube wall; and
   the machining operation is machining a weld preparation on an end of the tubular workpiece.

4. The system of claim 1, wherein:
   the cutting element includes a plurality of interchangeable cutting inserts.

5. The system of claim 3, wherein:
   the stabilizing mechanism includes at least one gripping arm to contact the interior tube wall of the tubular workpiece to hold the tubular workpiece in the determined position.

6. The system of claim 3, wherein:
   the stabilizing mechanism is configured to contact an outer wall of the tubular workpiece to hold the tubular workpiece in the determined position.

7. The system of claim 3, wherein:
   the cutting element is configured to cut the tubular workpiece to a predetermined length and machine the weld preparation on the end of the tubular workpiece in a single step.

8. The system of claim 3, wherein:
   the locating device is configured to determine a center of the tubular workpiece.

9. The system of claim 3, further comprising:
a control unit communicatively coupled to the locating device, the machining device and the positioning system, the control unit being configured to automatically determine the position of the tubular workpiece, align the machining device with the tubular workpiece, cut the tubular workpiece to length and machine the weld preparation on the tubular workpiece without manual intervention.

10. The system of claim 1, wherein:
the cutting element includes at least one cutting insert radially offset from a centerline of the cutting element, the cutting element being configured to rotate about the centerline.

11. The system of claim 10, wherein:
a radial position of the at least one cutting insert is adjustable with respect to the centerline of the machining device.

12. The system of claim 1, wherein:
the stabilizing mechanism and the cutting element are integrated with one another such that the stabilizing mechanism and the cutting element are moveable simultaneously under control of the positioning system; and
wherein the stabilizing mechanism is configured to extend past the cutting element and engage the interior tube wall of the tubular workpiece.

13. The system of claim 1, wherein:
the positioning system is configured to adjust a position of the machining device to align a centerline of the machining device with a longitudinal axis of the workpiece, such that the centerline of the machining device and the longitudinal axis of the workpiece are substantially coaxial.

* * * * *